US006413103B1

(12) United States Patent
Merz et al.

(10) Patent No.: US 6,413,103 B1
(45) Date of Patent: Jul. 2, 2002

(54) METHOD AND APPARATUS FOR GROUNDING MICROCOAXIAL CABLES INSIDE A PORTABLE COMPUTING DEVICE

(75) Inventors: Nicholas G. L. Merz, San Carlos; Michael Kriege, San Jose, both of CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/724,850

(22) Filed: Nov. 28, 2000

(51) Int. Cl.$^7$ .............................................. H01R 13/648
(52) U.S. Cl. ..................................... 439/98; 174/117 FF
(58) Field of Search ............................. 439/95, 98, 99, 439/108, 579, 580, 581, 502, 162, 164, 165; 174/117 FF, 117 F, 88 C, 78

(56) References Cited

U.S. PATENT DOCUMENTS

| 3,568,128 A | 3/1971 | Taylor |
| 4,046,451 A | 9/1977 | Juds et al. |
| 4,056,299 A | 11/1977 | Paige |
| 4,163,598 A | 8/1979 | Bianchi et al. |
| 4,184,729 A | 1/1980 | Parks et al. |
| 4,662,067 A | 5/1987 | Abraham ...................... 29/861 |
| 4,739,126 A | 4/1988 | Gutter et al. .................. 174/65 |
| 4,740,794 A | 4/1988 | Phillips et al. ............... 343/702 |
| 4,768,004 A | 8/1988 | Wilson ........................ 333/246 |
| 4,773,879 A | 9/1988 | Pauza et al. ................. 439/579 |
| 4,813,639 A | 3/1989 | Midkiff et al. .............. 248/68.1 |
| 4,836,791 A | 6/1989 | Grabbe et al. ................. 439/79 |
| 4,964,814 A | 10/1990 | Tengler et al. ............... 439/607 |
| 4,973,259 A | 11/1990 | Sachs .......................... 439/98 |
| 5,046,966 A | 9/1991 | Snyder et al. ............... 439/579 |
| 5,060,373 A | 10/1991 | Machura et al. .............. 29/858 |
| 5,083,929 A | 1/1992 | Dalton ......................... 439/98 |
| 5,122,068 A | 6/1992 | Koss ............................. 439/98 |
| 5,137,470 A | 8/1992 | Doles et al. ................. 439/578 |
| 5,154,636 A | 10/1992 | Vaccaro et al. ............. 439/583 |
| 5,167,533 A | 12/1992 | Rauwolf ...................... 439/583 |
| 5,169,343 A | 12/1992 | Andrews et al. ............ 439/608 |
| 5,184,965 A | 2/1993 | Myschik et al. ............ 439/578 |
| 5,190,473 A | * 3/1993 | Mroczkowski et al. ..... 439/580 |
| 5,217,391 A | 6/1993 | Fisher, Jr. ................... 439/578 |
| 5,273,457 A | 12/1993 | Zell et al. ................... 439/581 |
| 5,280,254 A | 1/1994 | Hunter et al. ............... 333/124 |
| 5,293,298 A | 3/1994 | Foglia ........................ 361/113 |
| 5,334,051 A | 8/1994 | Devine et al. .............. 439/583 |
| 5,354,217 A | 10/1994 | Gabel et al. ................. 439/583 |
| 5,380,216 A | 1/1995 | Broeksteeg et al. ......... 439/352 |
| 5,390,075 A | * 2/1995 | English et al. .............. 361/683 |
| 5,393,021 A | 2/1995 | Nelson ......................... 248/71 |
| 5,401,175 A | 3/1995 | Guimond et al. ............. 439/38 |
| 5,417,588 A | 5/1995 | Olsone et al. .............. 439/585 |
| 5,435,745 A | 7/1995 | Booth ......................... 439/584 |
| 5,453,756 A | 9/1995 | Lowrey ....................... 343/892 |
| 5,454,734 A | 10/1995 | Egfert et al. ................ 439/578 |
| 5,460,533 A | 10/1995 | Broeksteeg et al. ......... 439/101 |
| 5,467,062 A | 11/1995 | Burroughs .................. 333/124 |

(List continued on next page.)

Primary Examiner—Tulsidas Patel
(74) Attorney, Agent, or Firm—Beyer Weaver & Thomas, LLP

(57) ABSTRACT

Methods and apparatus for reducing electromagnetic interference emissions are disclosed. According to one aspect of the present invention, a cable includes a first coaxial cable component, a second coaxial cable component, and a grounding plate. The first coaxial cable component has a first end and a second end, and includes a first shield. The second coaxial cable component also has a first end and a second end, and includes a second shield. The grounding plate is arranged to be conductively coupled, e.g., electrically coupled, to the first shield and the second shield, and is offset from the first end of the first coaxial cable component, the second end of the first coaxial cable component, the first end of the second coaxial cable component, and the second end of the second coaxial cable component. In one embodiment, the grounding plate is also arranged to contact a ground source.

28 Claims, 6 Drawing Sheets

U.S. PATENT DOCUMENTS

| | | | |
|---|---|---|---|
| 5,487,681 A | 1/1996 | Star et al. .................... | 439/581 |
| 5,493,702 A | 2/1996 | Crowley et al. ............... | 455/89 |
| 5,518,422 A | 5/1996 | Zell et al. .................... | 439/608 |
| 5,562,462 A | 10/1996 | Matsuba et al. ............... | 439/70 |
| 5,563,562 A | 10/1996 | Szwec ........................ | 333/260 |
| 5,570,068 A | 10/1996 | Quan .......................... | 333/33 |
| 5,595,502 A | 1/1997 | Allison ....................... | 439/429 |
| 5,657,196 A | 8/1997 | Chaudhry et al. .......... | 361/117 |
| 5,681,176 A * | 10/1997 | Ibaraki et al. ............... | 439/165 |
| 5,711,014 A | 1/1998 | Crowley et al. ............ | 455/571 |
| 5,711,676 A | 1/1998 | Michael, III ................ | 439/63 |
| 5,713,748 A | 2/1998 | Mulvihill .................... | 439/98 |
| 5,724,220 A | 3/1998 | Chaudhry et al. .......... | 361/119 |
| 5,751,534 A | 5/1998 | DeBalko ..................... | 361/119 |
| 5,758,004 A | 5/1998 | Alarcon et al. ............. | 385/135 |
| 5,768,084 A | 6/1998 | Chaudhry et al. .......... | 361/120 |
| 5,775,934 A | 7/1998 | McCarthy ................... | 439/427 |
| 5,782,656 A | 7/1998 | Zell et al. ................... | 439/579 |
| 5,785,548 A | 7/1998 | Capper et al. ............. | 439/409 |
| 5,794,897 A | 8/1998 | Jobin et al. ................ | 248/74.4 |
| 5,795,188 A | 8/1998 | Harwath ..................... | 439/583 |
| 5,802,710 A | 9/1998 | Bufanda et al. ............. | 29/828 |
| 5,803,768 A | 9/1998 | Zell et al. ................... | 439/608 |
| 5,807,126 A | 9/1998 | Bethurum ................... | 439/259 |
| 5,809,429 A | 9/1998 | Knop et al. ................. | 455/523 |
| 5,815,122 A | 9/1998 | Nurberger et al. .......... | 343/767 |
| 5,827,082 A * | 10/1998 | Laine ........................ | 439/165 |
| 5,831,198 A | 11/1998 | Turley et al. ................ | 89/1.11 |
| 5,850,056 A | 12/1998 | Harwath ..................... | 174/40 |
| RE36,065 E | 1/1999 | Andrews et al. ............ | 439/608 |
| 5,879,188 A | 3/1999 | Clyatt ........................ | 439/578 |

* cited by examiner

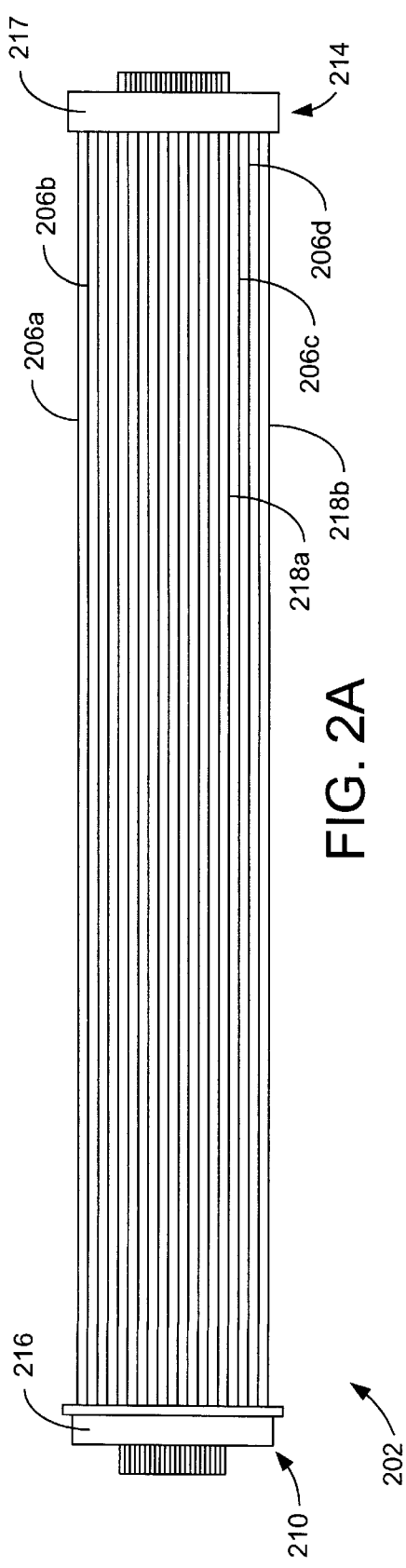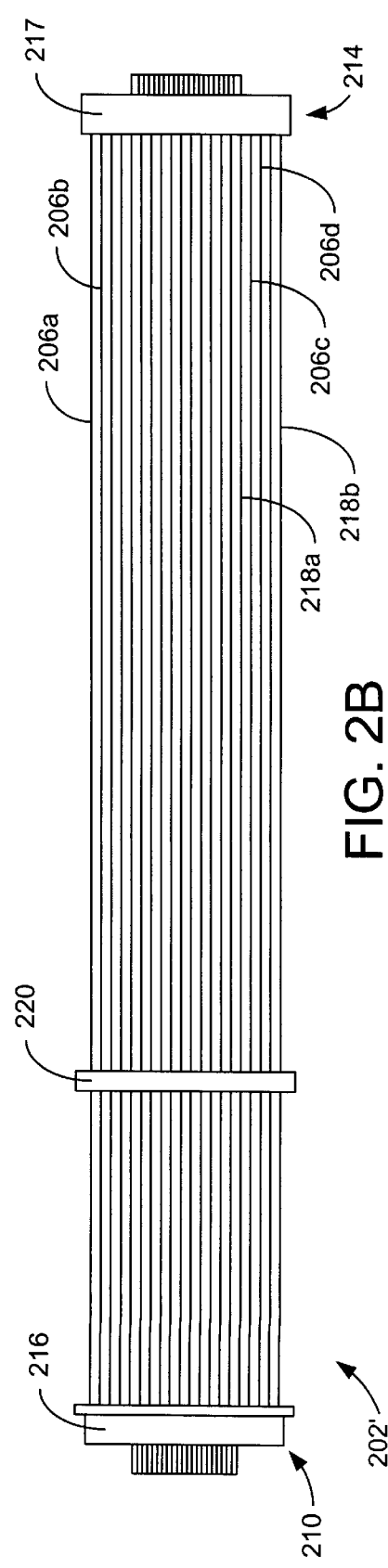

METHOD AND APPARATUS FOR GROUNDING MICROCOAXIAL CABLES INSIDE A PORTABLE COMPUTING DEVICE

BACKGROUND OF THE INVENTION

1. Field of Invention

The present invention relates generally to portable computing devices. More particularly, the present invention relates to an apparatus for reducing electromagnetic interference (EMI) noise emitted from a portable computing device.

2. Description of the Related Art

Advances in technology have enabled the size of personal computers to decrease. As a result, the use of portable computers such as notebook, or laptop, computers and notepad computers is rapidly increasing. The portability of notebook computers and notepad computers enables a user to keep his or her computer readily accessible such that computing resources are effectively always at hand. By way of example, a notebook computer running on a battery pack enables a user to access computational resources without the need for external sources of electricity.

Many portable computers are configured such that a display screen of the computer pivots, or rotates, with respect to the base of the computer. FIG. 1 is a diagrammatic representation of a portable computer or, more specifically, a notebook computer. A notebook computer 102 generally includes a display section 106 and a base section 110. Display section 106 typically includes a display screen 114, while base section 110 often includes an input/output device such as a keyboard 118, and houses a central processing unit and memory devices (not shown).

In general, within notebook computer 102, circuitry associated with base section 110 must be electrically coupled to circuitry associated with display section 106. As such, within notebook computer 102, a cable mechanism (not shown) is often used to facilitate the transfer of signals, e.g., signals associated with low voltage differential signaling (LVDS), between base section 110 and display section 106.

In order to maintain a relatively small size for notebook computer 102, relatively thin, or low-profile, cable mechanisms are typically used to facilitate the transfer of LVDS signals within notebook computer 102. For many portable computing devices, a flexible circuit such as a polyemide flexible circuit may be used due to its flexible characteristics and low profile. However, a polyemide flexible circuit does not have any inherent electromagetic compatibility (EMC) shielding within it. As a result, electromagnetic interference (EMI) emissions, such as emissions which may be in the range of approximately 100 megaHertz (MHz) to approximately 1000 MHz, generally result from the LVDS signals associated with a polyemide flexible circuit with no shielding.

EMI is typically characterized as electromagnetic emissions from a device, e.g., notebook computer 102, which have the tendency to interfere with the operation of another device or system. By way of example, EMI emissions from notebook computer 102 may interfere at relatively close range with FM radio reception, television reception, controls on an aircraft such as a rudder control, and operations of a cellular telephone. EMI emissions may result from an LVDS signal, as a cable mechanism which carries an LVDS signal acts as a noisy antenna which picks up EMI noise in base section 110 and pipes the EMI noise out of notebook computer 102.

As will be understood by those skilled in the art, a section of notebook computer 102 that is particularly susceptible to emitting EMI is a "junction" 130 between base section 110 and display section 106 which effectively separates base section 110 and display section 106. A small gap (not shown) is often a part of junction 130, and acts as an "emissions point" that is characterized by a relatively large amount of irradiated EMI emissions. Typically, the emissions point is located at approximately the area through which a cable mechanism that transfers signals between base section 110 and display section 106 passes.

A cable mechanism which serves as a conduit between base section 110 and display section 106 generally has a higher level of EMI emissions than other cable mechanisms that may be associated with notebook computer 102. This higher level of EMI emissions is due, at least in part, to the fact that the cable mechanism between base section 110 and display section 106 has a substantially vertical orientation while LVDS signals are being transferred between base section 110 and display section 106. In other words, the fact that at least part of the cable mechanism or flexible circuit, i.e., the part in display section 106, is oriented along a y-axis 134 during the operation of notebook computer 102 typically provides increased EMI emissions relative to other cables within notebook computer 102.

In order to lower the amount of EMI emissions associated with cable mechanisms such as a flexible circuit, ferrite may be added in proximity to the emissions point or junction 130 associated with notebook computer 102. The ferrite effectively absorbs energy, and blocks at least some EMI emissions. Hence, the use of a ferrite block or wrapping may provide at least some EMC shielding. While the use of ferrite has been observed as being relatively effective, ferrite blocks often have a high profile, i.e., ferrite blocks often have at least one physical dimension such as a thickness which is large with respect to the dimensions of notebook computer 102. In other words, ferrite blocks generally occupy more space than is acceptable within notebook computer 102. Additionally, ferrite blocks are relatively expensive, and may cause undesirable pooling, or visible swirls, in the liquid crystal displays which are often associated with display section 106.

Therefore, what is needed is a low profile, relatively inexpensive cable mechanism for transferring LVDS signals without producing significant EMI emissions within a portable computing device.

SUMMARY OF THE INVENTION

The present invention relates to a cable which enables electromagnetic interference emissions to be reduced. According to one aspect of the present invention, a cable includes a first coaxial cable component, a second coaxial cable component, and a grounding plate. The first coaxial cable component has a first end and a second end, and includes a first shield. The second coaxial cable component also has a first end and a second end, and includes a second shield. The grounding plate is arranged to be conductively coupled, e.g., electrically coupled, to the first shield and the second shield, and is offset from the first end of the first coaxial cable component, the second end of the first coaxial cable component, the first end of the second coaxial cable component, and the second end of the second coaxial cable component. In one embodiment, the grounding plate is also arranged to contact a ground source.

In another embodiment, the cable includes a first connector that is coupled to the first end of the first coaxial cable component. The first connector is also coupled to the first end of the second coaxial cable component. In such an embodiment, the first connector may include a grounding shield that is arranged to be conductively coupled to the first shield at the first end of the first coaxial cable component and to the second shield at the first end of the second coaxial cable component.

A cable which enables contact to be made between a grounding plate and a ground source provides for the transmission of low voltage differential signals while being relatively immune to noise, reducing the emission of electromagnetic interference. Reducing the emission of electromagnetic interference enables a device, e.g., a portable computing device, which uses the cable to operate without significantly affective the performance of other devices in proximity to the cable.

According to another aspect of the present invention, a computing system includes a base portion, a display portion, and a cable assembly. The base portion includes a central processing unit and a first receptacle, while the display portion includes a display screen, a second receptacle, and a first conductive surface. The cable assembly has a first end and a second end, and includes a plurality of coaxial cables as well as a first grounding plate. Each coaxial cable included in the plurality of coaxial cables includes a shield that is conductively coupled to the first grounding plate, which is essentially in direct contact, e.g., in electrical contact, with the first conductive surface. The first end is arranged to interface with the first receptacle and the second end being arranged to interface with the second receptacle such that the cable assembly is effectively "plugged into" the first receptacle and the second receptacle.

In one embodiment, the cable assembly is arranged to enable a data signal to pass between the base portion and the display portion, and the substantially direct contact between the first grounding plate and the first conductive surface is arranged to reduce the emission of electromagnetic interference associated with enabling the data signal to pass between the base portion and the display portion. In such an embodiment, the data signal may be a low voltage differential signal.

According to still another aspect of the present invention, an overall cable includes first and second microcoaxial cable components, as well as first and second connectors. The first and second microcoaxial cable components each include a shield and a center conductor, and each have a first end and a second end. The first connector is coupled to the shield and the center conductor of the first cable component at the first end of the first cable component. The first connector is also being coupled to the shield and the center conductor of the second cable at the first end of the second cable. The second connector is coupled to the shield and the first center conductor at the second end of the first cable, and is also coupled to the shield and the second center conductor at the second end of the second cable.

In one embodiment, the overall cable includes a grounding plate that is conductively coupled to the shield of the first cable and the shield of the second cable. The grounding plate is generally positioned such that it is not in direct physical contact with the first connector or the second connector. In such an embodiment, the grounding plate may be coupled only to a portion of the first shield and a portion of the second shield.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 2A is a diagrammatic representation of an overall cable which includes microcoaxial cables in accordance with an embodiment of the present invention;

FIG. 2B is a diagrammatic representation of an overall cable, i.e., overall cable 202 of FIG. 2A, which includes a grounding point in accordance with an embodiment of the present invention;

DETAILED DESCRIPTION OF THE EMBODIMENTS

Figure 1:
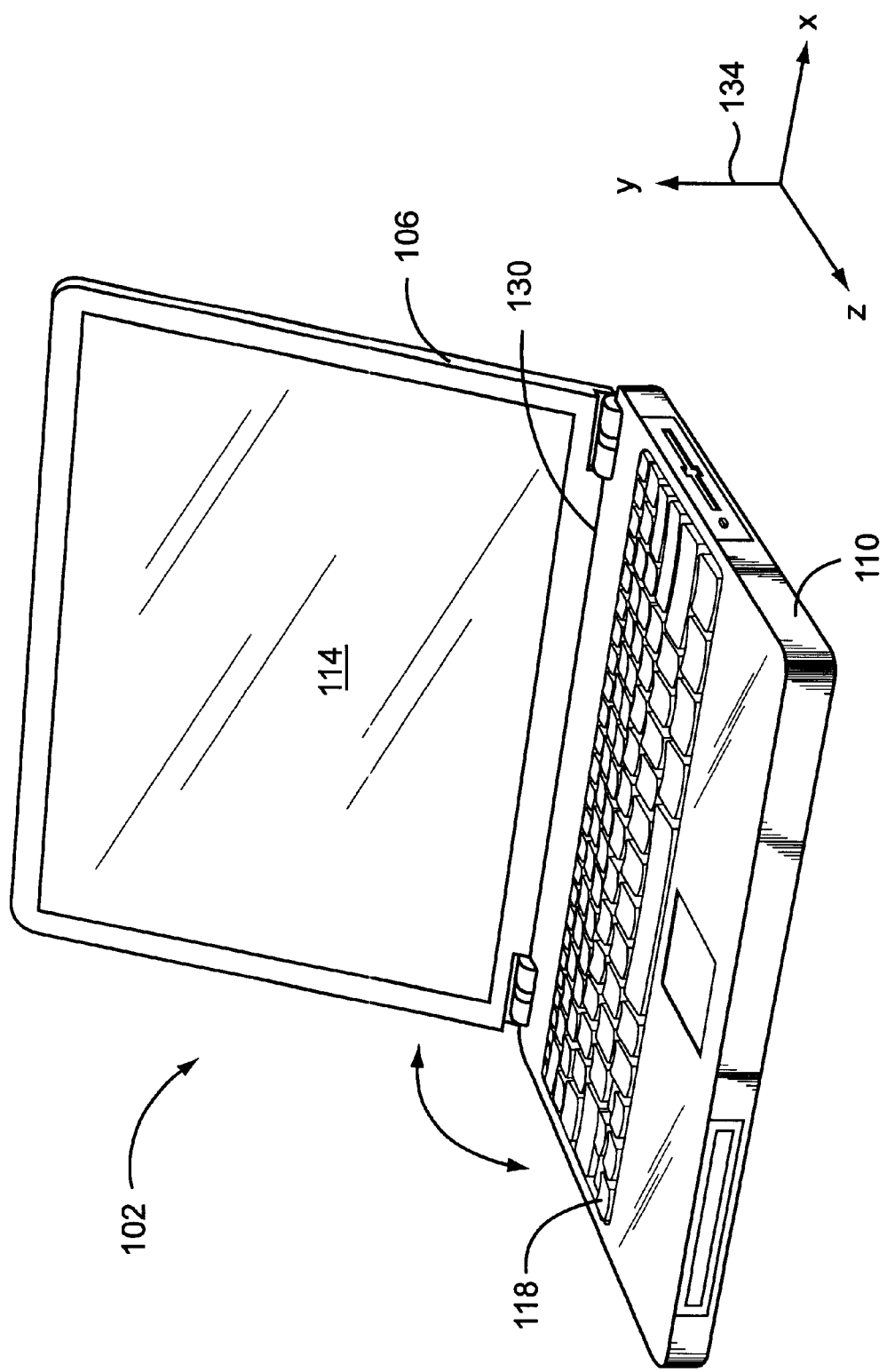
FIG. 1 is a diagrammatic representation of a portable, notebook computer.

Electromagnetic interference (EMI) emissions from a device such as a portable computing device may have an adverse affect on the operation of other devices, as for example, cellular telephones, televisions, and FM radios. Within a portable computing device, EMI emissions in the range of hundreds of megaHertz (mHz) are often associated with cables or circuitry which effectively enable a base section of the computing device to communicate with a display section of the computing device. To reduce the amount of EMI emissions associated with a portable computing device, ferrite may be added in proximity the cables or circuitry to absorb energy, and block at least some EMI emissions from emanating from the portable computing device. Although the use of ferrite blocks or wraps is generally suitable for blocking at least some EMI emissions, ferrite blocks and wraps are relatively expensive and often have a high profile, e.g., are relatively thick. As a result, ferrite components typically either occupy too much space within a computing device, or require the height or thickness of the computing device or, more specifically, a display portion of the computing device, to be increased. Ferrite blocks also have a tendency to be relatively heavy, and may cause pooling or slight distortion with respect to images presented on a display screen which is in proximity to the ferrite blocks.

The present invention provides improved approaches for reducing EMI emissions from a device such as a portable computing device. To maintain the low profile of a display portion of a portable computing device, while reducing the amount of EMI emissions associated with the portable computing device, microcoaxial cables, or microcoax cables, with grounding points may be used within a portable computing device. In an overall microcoaxial cable, i.e., an overall cable which is made up of microcoaxial cable components, each microcoaxial component cable is shielded with a coaxial ground line. By creating grounding points with respect to the shields, and effectively directly coupling the grounding points to a grounded section of the portable computing device, the amount of EMI emissions may be reduced. That is, the EMI emissions may be reduced as potential local irradiated emissions may be drained off through the grounding points.

Grounding an overall microcoaxial cable, which is arranged to carry low voltage differential signaling (LVDS) signals, at grounding points reduces EMI emissions without requiring the use of relatively expensive, bulky ferrites. Grounding the overall microcoaxial cable generally reduces EMI emissions when a ground associated with the computing device absorbs radiant energy generated by the base section and the display section. As such, an overall microcoaxial cable which includes grounding points along its length may be considered as including electromagnetic compatibility (EMC) shielding.

FIG. 2A is a diagrammatic representation of an overall microcoaxial cable 202 in accordance with an embodiment of the present invention. The overall microcoaxial cable 202 includes component microcoaxial cables 206, which are arranged to carry data or control signals, and end connectors 210, 214. Each component microcoaxial cable 206 includes a shield, an insulating layer, and a center conductor, as will be appreciated by those skilled in the art. An example of a component microcoaxial cable 206 will be described below with respect to FIG. 5.

In general, the size of component microcoaxial cables 206 may vary depending upon the requirements of a particular system. By way of example, the length of component microcoaxial cables 206 may vary depending upon the location of receptacles for end connections 210, 214 within a portable computing device. The diameter of each component microcoaxial cable 206 may also vary, although the diameter of each component microcoaxial cable 206 is typically less than approximately half of a millimeter.

Ends of each component microcoaxial cable 206 generally terminate at connectors 210, 214. Specifically, the center conductors and shields of component microcoaxial cables 206 are arranged to terminate at connectors 210, 214. Connectors 210, 214 are arranged to "plug into" receptacles associated with a display section and a base section of a portable computing device, respectively, as will be discussed below with respect to FIG. 3. In one embodiment, in order for overall cable 202 to maintain a low profile, e.g., a thin or flat profile, connectors 210, 214 may be either card reader edge connectors, or connectors which are suitable for terminating ribbon cables. More generally, connectors 210, 214 may be substantially any connector with a single-row pin layout. As shown, connectors 210, 214 do not necessarily have the same configuration or size. In other words, connectors 210, 214 may be different. The configuration and size of connectors 210, 214 may vary depending upon the requirements of the sections of a device with which connectors 210, 214 interface.

A surface 216 of connector 210 and a surface 217 of connector 214 are often plated with a conductive material to form a grounding surface. Surfaces 216, 217 are arranged to contact metal ground portions of connector receptacles or receptacle "shells" which are adapted to receive connectors 210, 214. That is, surfaces 216, 217 serve as metal shields which may be electrically or conductively coupled to the shields associated with component microcoaxial cables 206.

In addition to including component microcoaxial cables 206 which are arranged to carry data signals, e.g., LVDS signals, overall cable 202 may also include cables 218 which are arranged to carry power. By way of example, cable 218a may be arranged to as a power line, while cable 218b may be arranged as a ground line. Although cables 218 may be microcoaxial cables, cables 218 are not necessarily microcoaxial cables. For instance, cable 218b which is arranged as a ground line may be a wire or a wire cable, and not a microcoaxial cable.

In order to reduce the EMI emissions associated with overall cable 202, a grounding point or plane may be added along the length of overall cable 202 to provide a mechanism which may serve to ground shields of component microcoaxial cables 206 to a grounding surface or chassis. Referring next to FIG. 2B, an overall cable 202' which includes a grounding point will be described in accordance with an embodiment of the present invention. Overall cable 202' includes a grounding point 220, or overall ground bar, along its length. In general, grounding point 220 is located at a distance from connectors 210, 214 such that grounding point 220 in substantially not directly adjacent to connectors 210, 214. By way of example, grounding point 220 may be located substantially "mid-cable" with respect to the length of overall cable 202'. The location of grounding point 220 may be chosen such that when overall cable 202' is positioned within a portable computing device, grounding point 220 is positioned at a bottom edge of a display section of the portable computing device, as will be discussed below with respect to FIG. 3.

Grounding point 220 may be formed as an overall ground bar from two ground bars sandwiched around component cables 206, 218. Alternatively, grounding point 220 may be formed from a single ground bar which is bent to effectively encircle component cables 206, 218. Grounding point 220 is typically formed from a conductive material, e.g., a solderable conductive material, such as copper or tin-plated copper. Grounding point 220 may further include a conductive covering, e.g., sleeve or wrap, which is wrapped around the ground bars to mechanically strengthen grounding point 220.

The portions of components cables 206, 218 at grounding point 220 have exposed grounds. For example, the shields of component cables 206 are exposed to ground bars which are used to form grounding point 220. Ground bars which form grounding point 220 are arranged to contact exposed shields such that electrical contact may be made between the ground bars and the exposed shields.

The use of grounding point 220 enables potential local irradiated EMI emissions to be drained or bled off, rather than being radiated from the base of a display section of a portable computing device. That is, ground point 220, when grounded against a grounding surface of a portable computing device, allows EMI emissions to effectively bleed off before radiating from the enclosure of the portable computing device. By substantially preventing EMI emissions from radiating out of the enclosure of the portable computing device, the portable computing device may operate without affecting the operations of nearby devices, e.g., cellular phones and televisions.

Figure 3:
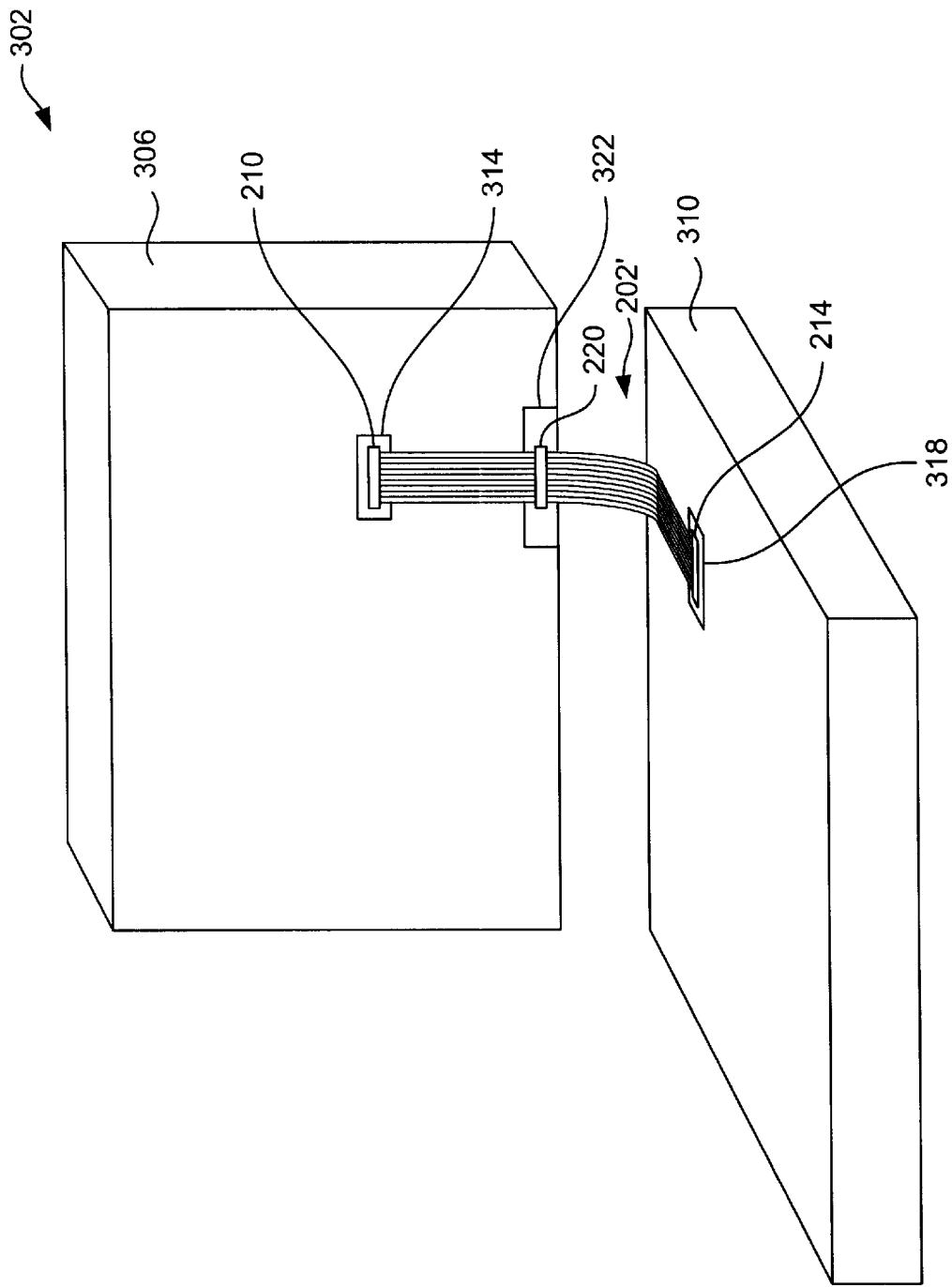
FIG. 3 is a diagrammatic representation of a notebook computer in which a display is connected to a base using microcoaxial cables with a grounding point in accordance with a first embodiment of the present invention.

With reference to FIG. 3, the use of an overall microcoaxial cable, e.g., overall microcoaxial cable 202', within a portable computing device will be described in accordance with an embodiment of the present invention. A portable computing device 302 generally includes a display section 306 and a base section 310. Details of portable computing device 302 have not been shown for ease of illustration. Display section 306 includes a receptacle 314 that is arranged to receive a connector end, e.g., connector 210 of overall microcoaxial cable 202'. Similarly, base section 310 includes a receptacle 318 that is also arranged to receive a connector end, e.g., connector 214 of overall microcoaxial cable 202'.

In general, receptacles 314, 318 are arranged to mate with their respective connectors 210, 214. By way of example, if connector 210 has a card reader edge, receptacle 314 would have a card reader end that is arranged to receive connector 210. Receptacles 314, 318 may include metal ground shells which are arranged to accommodate ground surfaces of connectors 210, 214, respectively, e.g., ground surfaces 216 and 217 as shown in FIGS. 2A and 2B.

Grounding point 220 of overall microcoaxial cable 202' is arranged to be conductively coupled to, e.g., physically held in substantially direct contact with, a portion of a chassis 322 of display section 306. In one embodiment, grounding point 220 may be coupled to the portion of chassis 322 through the use of a clip or similar device. The substantially direct contact between grounding point 220 and the portion of chassis 322 provides a ground path for the shields, e.g., shield lines, associated with the component cables of overall microcoaxial cable 202'. Hence, common mode emissions may be reduced by allowing radiant energy generated in base section 310 and display section 306 to be absorbed by the portion of chassis 322.

Although the location of the portion of chassis 322 which is in contact with grounding point 220 may vary, the location is typically chosen to be at an "entrance" to display section 306. That is, the location is chosen to coincide with an area which is typically characterized by a relatively high amount of radiating EMI emissions. As will be understood by those skilled in the art, one such location is at a section in display section 306 where overall microcoaxial cable 202' effectively first crosses into display section 306.

An overall microcoaxial cable has generally been described as including one grounding point or overall ground bar, formed from two ground bar components. It should be appreciated, however, that the number of grounding points included in an overall microcoaxial cable may vary widely depending upon the requirements of a particular system. In one embodiment, as the length of an overall microcoaxial cable increases, it may be desirable to also increase the number of grounding points along the overall microcoaxial cable. By way of example, more than one grounding point may be arranged to make contact with a chassis associated with a display portion of a computing device. Alternatively, multiple grounding points may be arranged such that at least one grounding point is in contact with the display portion and at least one grounding point is in contact with a base portion of the computing device.

Figure 4:
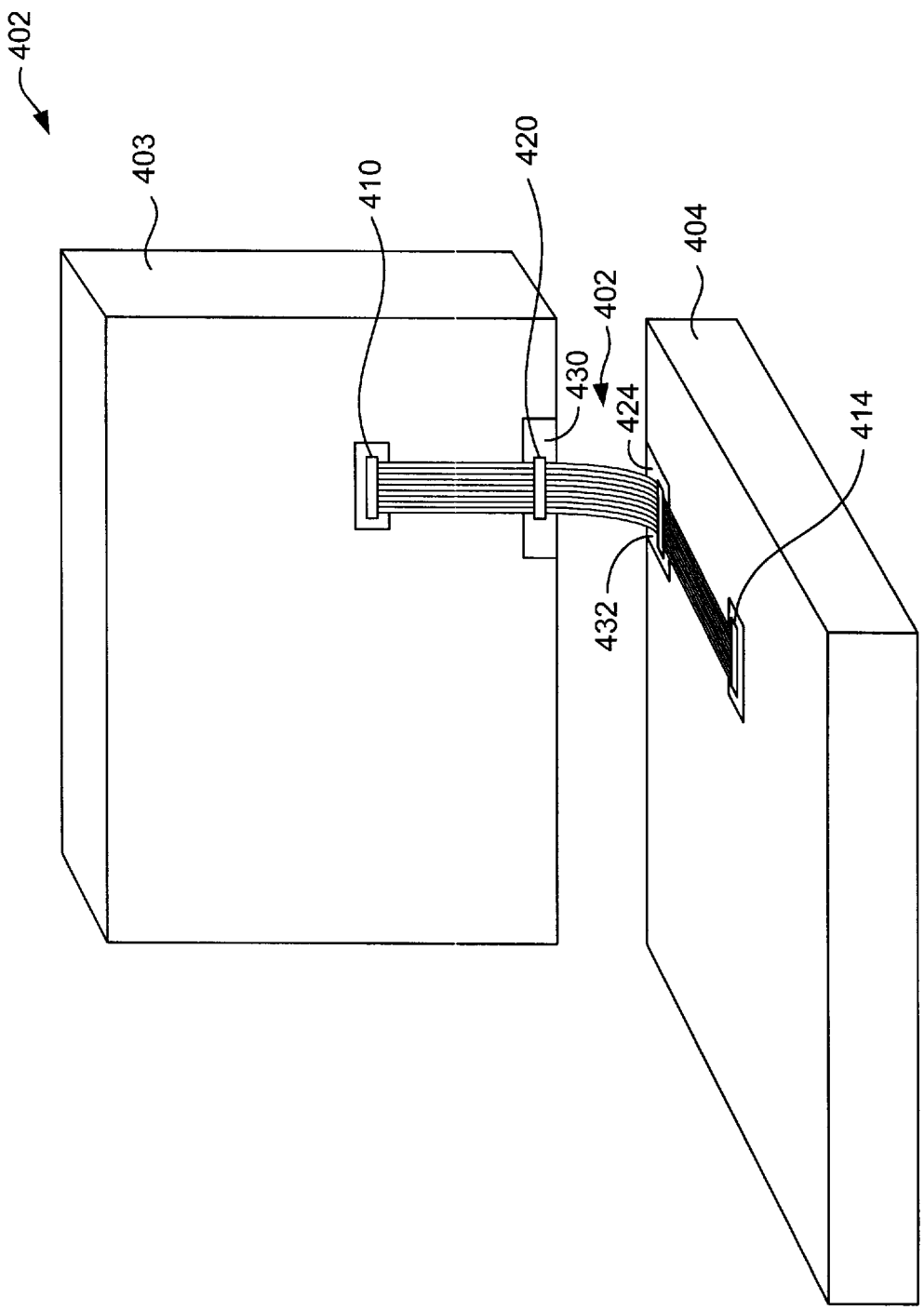
FIG. 4 is a diagrammatic representation of a notebook computer in which a display is connected to a base using microcoaxial cables with a plurality of grounding points in accordance with a second embodiment of the present invention.

FIG. 4 is a diagrammatic representation of a notebook computer in which a display portion is communicably connected to a base portion using an overall microcoaxial cable with a plurality of grounding points in accordance with an embodiment of the present invention. A notebook computer 402 includes a display section 403 and a base section 404 which are connected using an overall microcoaxial cable 402 that includes a first grounding point 420 and a second grounding point 424. First grounding point 420 is arranged to contact a grounded portion of a chassis 430 associated with display section 403, while second grounding point 424 is arranged to contact a grounded portion of a chassis 432 associated with base section 404. Including second grounding point 424, in addition to first grounding point 420, enables common mode emissions to absorbed within base section 404. Hence, EMI emissions may be further reduced with respect to notebook computer 402.

Figure 5:
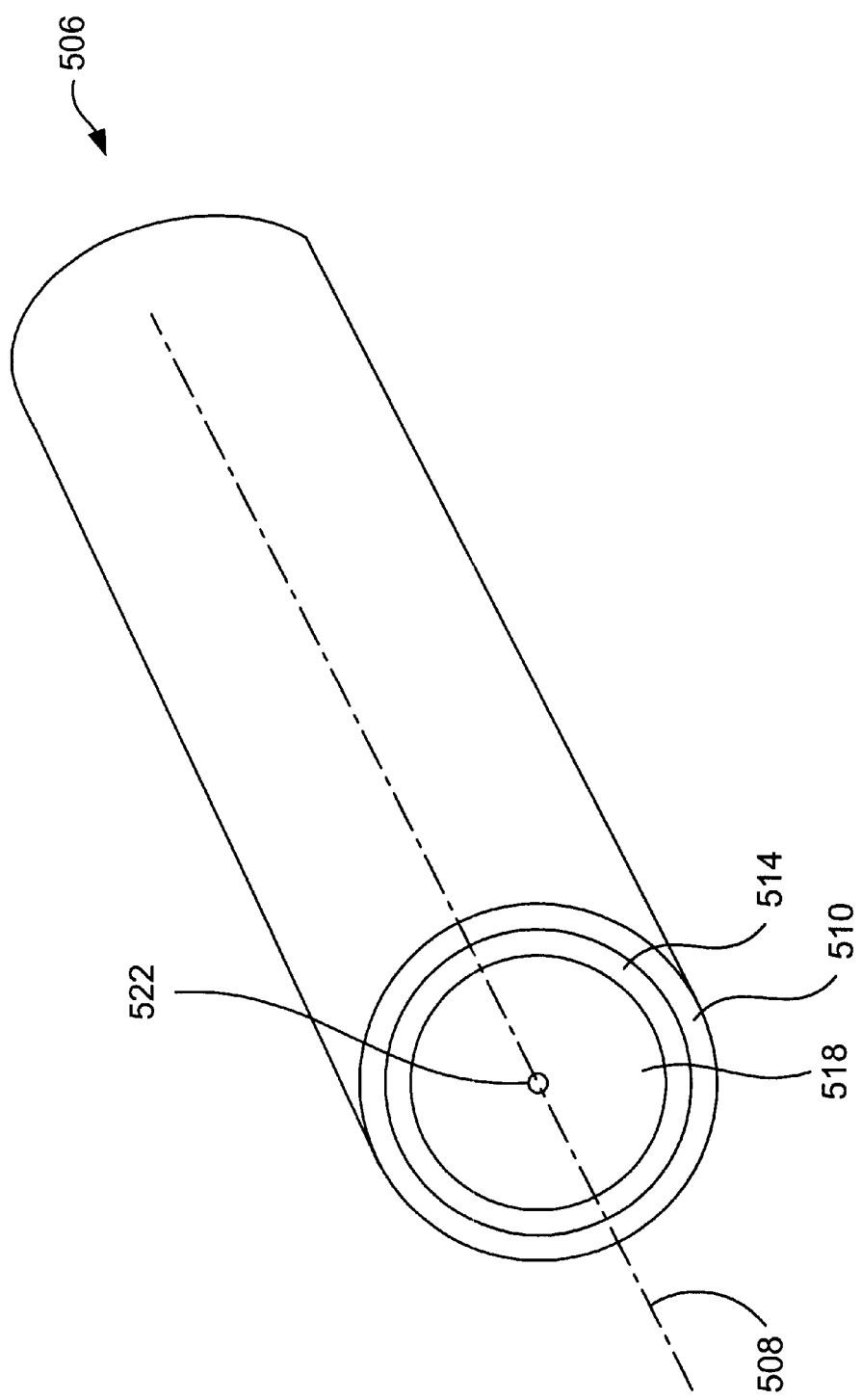
FIG. 5 is a diagrammatic representation of a section of a microcoaxial cable in accordance with an embodiment of the present invention.

FIG. 5 is a diagrammatic representation of a portion of a microcoaxial cable, i.e., component microcoaxial cable 206 of FIG. 2A, in accordance with an embodiment of the present invention. A section 506 of a microcoaxial cable such as component microcoaxial cable 206 of FIG. 2A generally has a substantially circular cross-section, and a central axis 508. The diameter associated with a section 506 may vary depending upon the requirements of a particular system in which section 506 is to be used. In one embodiment, the diameter of section 506 may be less than approximately half of a millimeter.

A microcoaxial cable generally includes, as shown in section 506, a center conductor 522, an insulating layer 518, a shield 514, and an insulated coating 510. It should be appreciated that the relative dimensions of center conductor 522, insulating layer 518, shield 514, and insulated coating 510 have been slightly exaggerated for purposes of illustration.

Center conductor 522 is arranged to carry a signal such as an LVDS signal. In other words, center conductor 522 serves as a transmission line, e.g., a transmission line which carries a data signal between a computer base and a display. Typically, center conductor 522 is formed from a low resistance material which has relatively low signal loss characteristics. By way of example, center conductor 522 may be formed from copper or a copper alloy.

Insulating layer 518, which is arranged to insulate center conductor 522 from shield 514, may be formed from substantially any material which prevents signals that are transmitted across center conductor 522 from being significantly affected by shield 514, which is generally tied to ground. Although the material which forms insulating layer 518 may vary, one suitable material is a teflon material. Shield 514, which is effectively a grounded surface, may be formed as a mesh of conductive wires, i.e., shield 514 may be formed from thin wires that are braided or are otherwise overlapped. As will be appreciated by those skilled in the art, shield 514 may be grounded at a termination point associated with an end connector such as end connectors 210 and 214 of FIG. 2A. In one embodiment, in addition to being grounded at end connectors 210 and 214, shield is also grounded at a ground point or plane such as grounding point 220 of FIG. 2B.

Insulated coating 510 may be a "sleeve" which is formed over shield 514 to effectively protect the microcoaxial cable and, further, to prevent shield 514 from being exposed. While insulated coating 510 may have substantially any thickness and may be formed from substantially any suitable insulating material, insulated coating 510 is generally a thin coating of a material such as mylar or rubber.

Figure 6:
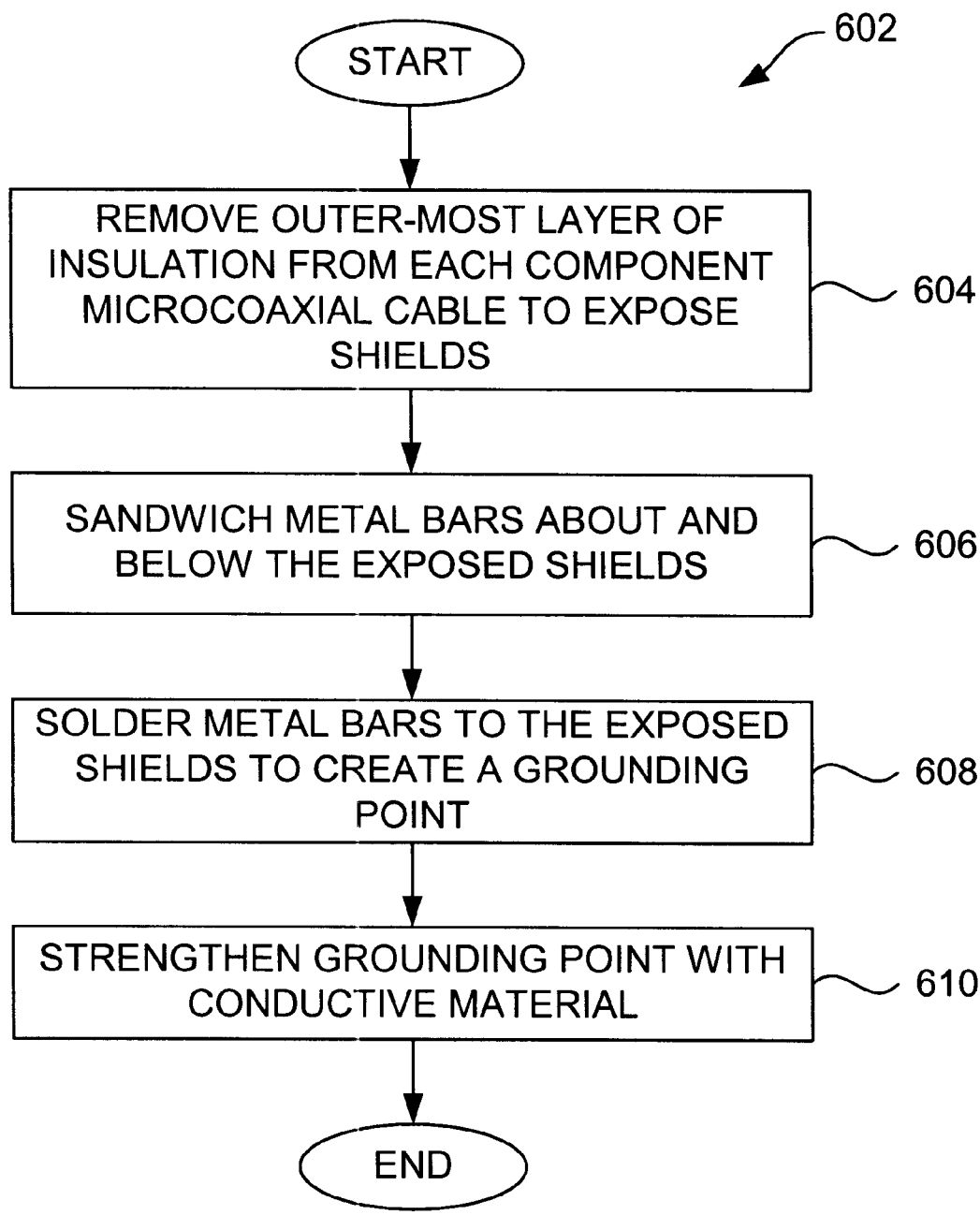
FIG. 6 is a process flow diagram which illustrates the steps associated with forming an overall microcoaxial cable in accordance with an embodiment of the present invention.

A grounding point of an overall microcoaxial cable may be formed from a variety of different methods. Referring next to FIG. 6, the creation of a grounding point, or plane, on an overall microcoaxial cable will be described in accordance with an embodiment of the present invention. It should be appreciated by those skilled in the art that an overall microcoaxial cable may be assembled using substantially any suitable method using any number of microcoaxial cables and two end connectors. By way of example, the ends of a microcoaxial cable may be stripped to effectively expose the center conductor, which may then be coupled to conductive ends of the end connectors. As discussed above with respect to FIGS. 2A and 2B, the end connectors may be low profile, ribbon-type connectors with a card reader edge. In general, however, the type of connectors used is dependent upon the requirements of the overall system. Additionally, the two connectors may be of different types.

A process 602 of creating a grounding point or plane on an overall microcoaxial cable begins at step 604 in which the outer-most layer of insulation is removed from each component microcoaxial cable to expose the shield of each component microcoaxial cable. That is, insulated coating 510 as shown in FIG. 5 may be removed from a portion of each component microcoaxial cable. Typically, the portions of substantially every component microcoaxial cable from which the outer-most layer of insulation is removed, e.g., stripped, are aligned such that the "stripped portion" of one component microcoaxial cable abuts the stripped portion of an adjacent component microcoaxial cable. In one embodiment, the portion of each component microcoaxial cable at which the shield is exposed is offset from the end connectors such that the portion may be aligned with an entry point into a display apparatus when end connectors are engaged within the display apparatus and a computer base.

Once the outer-most layer of insulation is removed from component microcoaxial cables to expose the shields, metal bars are sandwiched above and below the exposed shields in step 606. In general, a metal bars are placed about the exposed shields such that the exposed shields fall between the metal bars. The metal bars may be made from substantially any suitable conductive material, preferably a material which is solderable. By way of example, the metal bars may be aluminum, copper, or tin-plated copper.

In step 608, the metal bars are soldered to the exposed shields to create a grounding point or a grounding plane. After the metal bars are soldered to the shields, the grounding point may be strengthened in step 610 with a conductive material. Strengthening, i.e., mechanically strengthening, the grounding point typically involves wrapping the grounding point with a relatively thin, conductive material such as metal tape. The use of a conductive material enables the grounding point to be mechanically strengthened without significantly lowering the conductivity associated with the grounding point.

It should be appreciated that when the overall microcoaxial cable is installed in a computing device, the thin, conductive material in which the grounding point is wrapped makes contact, e.g., direct physical contact, with a conductive surface of a display chassis, thereby providing a ground path for the shields of the component microcoaxial cables. In general, the conductive material which is wrapped around the grounding point may be considered to be a part of the grounding point. Once the grounding point is strengthened, the process of creating a grounding point on an overall microcoaxial cable is completed.

Although only a few embodiments of the present invention have been described, it should be understood that the present invention may be embodied in many other specific forms without departing from the spirit or the scope of the present invention. By way of example, when an overall microcoaxial cable includes only a single grounding point along the span of the overall microcoaxial cable, the grounding point has been described as being arranged to contact a display component or chassis of a portable computing device. It should be appreciated, however, that in some cases, the single grounding point may instead be arranged to contact a base component of the portable computing device.

As described above, an overall microcoaxial cable may include one or two grounding points in addition to grounding plates or planes associated with the connector ends of the overall microcoaxial cable. Generally, the number of grounding points may vary widely depending upon the requirements of an overall system. For instance, for a system in which the overall microcoaxial cable is relatively long, more than two grounding points may be implemented on the overall cable to allow the EMI emissions to be reduced to an acceptable level without departing from the spirit or the scope of the present invention.

The materials used in the formation of a microcoaxial cable may vary widely. In general, it should be understood that a shield and a center conductor may be formed from substantially any suitable conductive material. Additionally, the insulation material which effectively separates the shield from the center conductor may be formed from any suitable insulating material.

The structure of a microcoaxial cable may also vary depending upon the requirements of a system which uses the microcoaxial cable. By way of example, while a microcoaxial cable has been described as including a center conductor, a insulating layer, a shield, and an insulated coating, a microcoaxial cable may include additional layers or components without departing from the spirit or the scope of the present invention. In one embodiment, for instance, in addition to a shield such as shield 514 of FIG. 5, a microcoaxial cable may include a secondary foil shield which may be positioned either between shield 514 and insulating layer 518, or between shield 514 and insulated coating 510.

While an overall microcoaxial cable has been described as including connectors at both ends, as shown in FIG. 2A, the use of connectors at the ends of an overall microcoaxial cable is optional. That is, an overall microcoaxial cable may include either only one end connector or no end connectors. When an overall microcoaxial cable has an end which does not terminate in a connector, that end may be substantially directly coupled to a receptacle, e.g., a receptacle associated with a display component. Such a receptacle may generally include connection lines for interfacing with center conductors of the component microcoaxial cables and shields for interfacing with shields of the component microcoaxial cables.

It should be appreciated that although connectors which are suitable for use in an overall microcoaxial cable have been described as having a low profile or small thickness, other connectors may also be suitable for use in an overall microcoaxial cable. For example, when the thickness of a connector is less critical than the width of a connector, a connector with a higher profile by smaller width such as a connector with a double-row pin layout may be used without departing from the spirit or the scope of the present invention.

In general, an overall microcoaxial cable has been described as being formed exclusively from component microcoaxial cables. In some embodiments, however, in addition to including component microcoaxial cables, an overall microcoaxial cable may include component cables which are not microcoaxial cables. When the component cables that are not microcoaxial cables are not to be grounded or otherwise tied to ground in any way, then it may not be necessary for a grounding plane to encompass the "non-microcoaxial" cables. That is, not all component cables included in the overall microcoaxial cable may necessarily be encompassed by the grounding plane.

To ground a grounding point or plate with respect to a surface on a display device, the grounding point has been described as being in substantially direct contact with the surface. Direct contact may generally be direct physical contact. However, in the context of contact between the grounding point and the surface, direct contact may also be continuous conductive contact. That is, substantially direct contact between a grounding point and a surface may not necessarily be direct physical contact as long as direct conductive, e.g., electrical, contact is maintained between the grounding point and the surface.

An overall microcoaxial cable of the present invention has generally been described as being suitable for use in a notebook computing device. It should be appreciated, however, that an overall microcoaxial cable may be suitable for use in substantially any system for which a reduced level of irradiated emissions is desired. More generally, an overall microcoaxial cable is suitable for use in substantially any system for which a low profile connecting device is need. Therefore, the present examples are to be considered as illustrative and not restrictive, and the invention is not to be limited to the details given herein, but may be modified within the scope of the appended claims.

What is claimed is:

1. A cable, the cable comprising:
   a first coaxial cable component, the first coaxial cable component including a first shield, the first coaxial cable component having a first end and a second end;
   a second coaxial cable component, the second coaxial cable including a second shield, the second coaxial cable component having a first end and a second end; and
   a grounding plate, the grounding plate being arranged to be conductively coupled to the first shield and the second shield, wherein the grounding plate is offset from the first end of the first coaxial cable component, the second end of the first coaxial cable component, the first end of the second coaxial cable component, and the second end of the second coaxial cable component.

2. A cable according to claim 1 wherein the grounding plate is further arranged to contact a ground source.

3. A cable according to claim 1 further including:
   a first connector, the first connector being coupled to the first end of the first coaxial cable component, the first connector further being coupled to the first end of the second coaxial cable component.

4. A cable according to claim 3 wherein the first coaxial cable component includes a first center conductor and the second coaxial cable component includes a second center conductor, the first connector including a first section arranged to be conductively coupled to the first center conductor at the first end of the first coaxial cable component and to the second center conductor at the first end of the second coaxial cable component.

5. A cable according to claim 4 wherein the first connector includes a grounding shield, the grounding shield being arranged to be conductively coupled to the first shield at the first end of the first coaxial cable component and to the second shield at the first end of the second coaxial cable component.

6. A cable according to claim 1 wherein the grounding plate is one of a copper plate, an aluminum plate, and a tin-plated copper plate.

7. A computing system, the computing system comprising:
   a base portion, the base portion including a central processing unit and a first receptacle;
   a display portion, the display portion including a display screen and a second receptacle, the display portion further including a first conductive surface; and
   a cable assembly, the cable assembly having a first end and a second end, the cable assembly including a plurality of coaxial cables and a first grounding plate, wherein each coaxial cable included in the plurality of coaxial cables includes a shield, the shield of each coaxial cable included in the plurality of coaxial cables being conductively coupled to the first grounding plate, the first grounding plate being arranged to be in substantially direct contact with the first conductive surface, the first end being arranged to interface with the first receptacle, the second end being arranged to interface with the second receptacle.

8. A computing system according to claim 7 wherein the cable assembly is arranged to enable a data signal to pass between the base portion and the display portion, and the substantially direct contact between the first grounding plate and the first conductive surface is arranged to reduce the emission of electromagnetic interference associated with enabling the data signal to pass between the base portion and the display portion.

9. A computing system according to claim 8 wherein the data signal is a low voltage differential signal.

10. A computing system according to claim 7 wherein the first grounding plate is arranged to be in substantially direct contact with the first conductive surface when the first end is interfaced with the first receptacle and the second end is interfaced with the second receptacle.

11. A computing system according to claim 10 wherein the base portion further includes a second conductive surface and the cable assembly further includes a second grounding plate, the shield of each coaxial cable included in the plurality of coaxial cables being conductively coupled to the second grounding plate, the second grounding plate being arranged to be in substantially direct contact with the second conductive surface when the first end is interfaced with the first receptacle and the second end is interfaced with the second receptacle.

12. A computing system according to claim 11 wherein the base portion includes a first edge and the display portion includes a second edge, the first edge being approximately adjacent to the second edge, the first conductive surface being positioned substantially at the second edge.

13. A computing system according to claim 12 wherein the second conductive surface is positioned substantially at the first edge.

14. A computing system according to claim 10 wherein the base portion includes a first edge and the display portion includes a second edge, the first edge being approximately adjacent to the second edge, the first conductive surface being positioned substantially at the second edge.

15. A computing system according to claim 7 wherein the cable assembly is arranged to enable a data signal to pass between the base portion and the display portion, and the substantially direct contact between the first grounding plate and the first conductive surface is arranged to reduce the emission of electromagnetic interference associated with the cable assembly.

16. A cable, the cable comprising:
   a first microcoaxial cable component, the first microcoaxial cable component including a first shield and a first center conductor, the first microcoaxial cable component having a first end and a second end;
   a second microcoaxial cable component, the second microcoaxial cable component including a second shield and a second center conductor, the second microcoaxial cable component having a first end and a second end;
   a first connector, the first connector being coupled to the first shield and the first center conductor at the first end of the first microcoaxial cable component, the first connector further being coupled to the second shield and the second center conductor at the first end of the second microcoaxial cable component;

a second connector, the second connector being coupled to the first shield and the first center conductor at the second end of the first microcoaxial cable component, the second connector further being coupled to the second shield and the second center conductor at the second end of the second microcoaxial cable component; and a grounding plate, the grounding plate being arranged to be conductively coupled to the first shield and the second shield, wherein the grounding plate is not in direct contact with the first connector and the grounding plate is not in direct contact with the second connector.

17. A cable according to claim 16 wherein the grounding plate is coupled only to a portion of the first shield and a portion of the second shield.

18. A cable according to claim 16 wherein the first connector includes a first grounding shield and the second connector includes a second grounding shield, the first grounding shield being arranged to be conductively coupled to the first shield at the first end of the first microcoaxial cable component and to the second shield at the first end of the second microcoaxial cable component, the second grounding shield being arranged to be conductively coupled to the first shield at the second end of the first microcoaxial cable component and to the second shield at the second end of the second microcoaxial cable component.

19. A cable according to claim 16 wherein the grounding plate is one of a copper plate, an aluminum plate, and a tin-plated copper plate.

20. A cable for connecting two components of a computer system, comprising:

an array of microcoaxial cables defined by a first end and an opposite second end, each of the microcoaxial cables including a center conductor and a shield; and a ground plate electrically coupled to the shields of a substantial number of the microcoaxial cables, the ground plate being disposed in its entirety between the first and second ends of the plurality of microcoaxial cables, the ground plate being configured to be electrically coupled to a conductive surface of one of the two components of the computer system so as to reduce EMI emissions of the computer system.

21. The cable as recited in claim 20 wherein the computer system is a portable computing device, and wherein the two components are a base and a display of the portable computing device.

22. The cable as recited in claim 21 wherein the conductive surface is part of a ground chassis disposed inside the base of the portable computing device.

23. The cable as recited in claim 21 wherein the conductive surface is part of a ground chassis disposed inside the display of the portable computing device.

24. The cable as recited in claim 20 wherein the array of microcoaxial cables are used to facilitate the transfer of signals associated with low voltage differential signaling (LVDS).

25. The cable as recited in claim 20 further including a second ground plate electrically coupled to the shields of a substantial number of the microcoaxial cables, the second ground plate being disposed in its entirety between the first and second ends of the plurality of microcoaxial cables, the second ground plate being configured to be electrically coupled to a conductive surface of one of the two components of the computer system so as to reduce EMI emissions of the computer system.

26. The cable as recited in claim 20 wherein the ground plate is disposed proximate the point at which the cable leaves the component of the computer system.

27. The cable as recited in claim 20 further including connectors disposed at the first and second ends of the array of microcoaxial cables.

28. The cable as recited in claim 20 wherein the shield of a substantial number of the microcoaxial cables are electrically coupled to a grounding portion of the connectors.

* * * * *